Patented Oct. 24, 1950

2,527,494

UNITED STATES PATENT OFFICE 2,527,494

PROCESS FOR PREPARATION OF ORTHOFORMIC ESTERS

John W. Copenhaver, Easton, Pa., assignor to General Aniline & Film Corporation, New York, N. Y., a corporation of Delaware No Drawing. Application December 21, 1946, Serial No. 717,819

11 Claims. (Cl. 260—615)

This invention relates to an improved process for the preparation of orthoformic esters from formiminoester hydrohalides.

Briefly stated, the process of the present invention comprises carrying out the alcoholysis of a formiminoester hydrohalide under substantially anhydrous conditions in the presence of an inert liquid diluent which is a non-solvent for ammonium halides so that the ammonium halide formed during the reaction is precipitated and thus removed from the reaction. It has been found that when carrying out the reaction in this manner, it is possible to shorten greatly the time of reaction and to increase materially the yield of orthoformic esters.

While orthoesters have previously been prepared from a variety of raw materials including in addition to iminoester hydrochlorides, such compounds as chloroform and orthotrithioesters, the methods of preparation which have been used previously have resulted in low yields or have required the use of expensive materials or long periods of time. While liquid diluents have been employed in the preparation of orthoacetic acid esters by the alcoholysis of the iminoester hydrochloride, the diluent employed, a refluxing ether solution, was employed primarily as a convenient means of temperature control, and the ammonium chloride formed was too soluble therein to be suitable for use in practising the present invention. In addition, when the alcoholysis reaction has been carried out in the presence of a refluxing ether solution, it has been noticed that the reaction did not proceed as well as it did when no diluent was present except in the case of iminoester hydrochlorides of the type

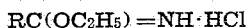

in which R was a primary and normal alkyl group, so that the prior art indicates that the presence of diluents should be avoided in the alcoholysis of formiminoester hydrohalides.

It has been found that the alcoholysis of a formiminoester hydrohalide, which proceeds in accordance with the following equation, wherein R stands for a monovalent radical of an alcohol including alkanols, alkenols, aralkanols, cycloalkanols, and heterocyclicalkanols, and X stands for halogen:

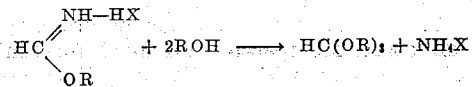

is a reversible reaction, i. e. the ammonium halide formed reacts with the orthoester to produce the iminoester hydrohalide. The reversal of the desired reaction is largely eliminated so that the desired alcoholysis reaction can proceed to completion by carrying out the reaction in the presence of an inert liquid diluent in which the ammonium halide is relatively insoluble so that it is precipitated as it is formed and thus removed.

The details of the present invention may be most readily understood by first considering several specific examples which illustrate preferred embodiments thereof. The parts are by weight.

Example 1

To a glass reactor equipped with a condenser, stirrer, thermometer and gas inlet tube was added 700 parts of dry chlorobenzene and 106 parts of absolute methanol. The mixture was cooled in an ice-salt bath to a temperature within the range of —5 to —10° C. To this chilled solution was added 81 parts of liquid hydrogen cyanide and slowly, over a period of 1.5 hours, 120 parts of dry hydrogen chloride while maintaining the temperature of the reaction mixture below 10° C. The reaction mixture was stirred for 2 hours after the addition of the hydrogen chloride was complete and then stored below 10° C. for 18 hours. The solvent was then decanted from the methyl formiminoester hydrochloride which had precipitated. To the moist iminoester hydrochloride was then added 480 parts of absolute methanol, 2175 parts of dry chlorobenzene and the pH of the reaction mixture was adjusted to a pH of 6 by the addition of sodium methylate. The mixture was then heated for 12 hours at 45° C. During this time the formiminoester hydrochloride slowly dissolved and the ammonium chloride formed precipitated. The reaction mixture was then cooled to 5° C. and filtered. The filtrate was made slightly alkaline by the addition of sodium methylate and distilled. Upon distillation, there was obtained 210 parts of methyl orthoformate (73.6% of the theoretical based on the amount of hydrogen cyanide employed) boiling at 98–100° C.

In a number of other runs in which the inert diluent was omitted and in which molar ratios of methanol to the theoretical yield of methyl formiminoester hydrochloride obtainable, varied from 7:1 to 15:1 and the time and temperature of reaction varied from 24–48 hours and from 40–50° C. respectively, yields of methyl orthoformate ranging from 11.3–49% of the theoretical were obtained.

Example 2

To a glass reactor similar to the one employed in Example 1 was added 285 parts of methyl formiminoester hydrochloride, 480 parts of dry methanol and 1775 parts of dry m-xylene. The pH of the resultant mixture was adjusted to 6 by the addition of sodium methylate. The reaction mixture was then heated at 45° C. for 24 hours. The mixture was then filtered to remove the precipitated ammonium chloride and the filtrate made slightly alkaline by the addition of sodium methylate. Upon distillation, there was obtained 203 parts of methyl orthoformate (63.8% of the theoretical) boiling at 98–99° C.

Example 3

To a glass reactor similar to the one employed in Example 1 was added 475 parts of methyl formiminoester hydrochloride, 800 parts of dry methanol and 900 parts of dry benzene. The pH of the resultant solution was adjusted to 6 by the addition of sodium methylate and the reaction mixture then heated at 45° C. for 24 hours. The mixture was then filtered to remove the ammonium chloride formed and the filtrate made slightly alkaline by the addition of sodium methylate. Upon distillation, there was obtained 327 parts of methyl orthoformate (61.7% of the theoretical) boiling at 99° C.

It should be understood that the foregoing examples are illustrative only of the present invention and that various modifications such as those mentioned below, which will suggest themselves to those skilled in the art, may be made without departing from the spirit of this invention or the scope of appended claims.

Thus, in place of the methyl formiminoester hydrohalides mentioned in the foregoing examples, the formiminoester hydrohalides of other alkanols, alkenols, aralkanols, cycloalkanols and heterocyclicalkanols, such as ethyl formiminoester hydrochloride, butyl formiminoester hydrochloride, cyclohexyl formiminoester hydrochloride, allyl formiminoester hydrochloride, benzyl formiminoester hydrochloride and furfuryl formiminoester hydrochloride. It will be noted that it is preferable to employ the formiminoester hydrochloride which corresponds to the orthoformic acid ester which is desired as a product. If desired, other hydrohalide salts, i. e., hydrofluoride, hydrobromide, or hydroiodide, may be employed as the equivalent of the hydrochloride.

Likewise, the reaction is applicable to the production not only of methyl orthoformic esters but also to the production of the orthoformic esters of alcohols broadly including alkanols, alkenols, aralkanols, cycloalkanols and heterocyclicalkanols including by way of example, ethanol, propanol, butanol, allyl alcohol, cyclohexanol, benzyl alcohol, furfuryl alcohol and the like, which may be employed as the equivalent of the methanol specified in the foregoing examples. It will be apparent that the particular orthoformic ester which is obtained as a product will correspond to the particular alcohol employed in the alcoholysis reaction.

The ratio of alcohol to the formiminoester hydrohalide employed in the reaction may vary quite widely. It will be apparent that in order to insure the maximum yields of the orthoformic ester at least 2 mols of alcohol per mol of formiminoester hydrohalide and preferably an excess of the theoretical amount of alcohol should be employed. This molar excess generally will vary from 40–500% but larger amounts can be employed if desired.

Likewise, the quantity of inert diluent may be varied through relatively wide range. Preferably, an amount at least equal to the weight of the alcohol used in the alcoholysis will be employed and larger amounts, ranging up to 10 times the amount of the alcohol, have been successfully used. The use of a large excess of inert diluent is particularly desirable when the diluent employed has a boiling point above the distillation temperature of the orthoester obtained since in this instance the diluent can be used repeatedly without rectification. It will be apparent that any inner diluent in which the ammonium halide is relatively insoluble may be used and I have found that a wide variety of liquid hydrocarbons and their halogenated derivatives are particularly useful. As examples of compounds which are the equivalent of the chlorbenzene, m-xylene and benzene specified in the foregoing examples may be mentioned ethylene dichloride, ethylene dibromide, pentane, hexane, cyclohexane, chlorcyclohexane, benzene and toluene. Compounds such as ether have been found to have too high a solvency for ammonium halide to be particularly valuable for use in the present invention.

It has also been found that the reaction may be carried out from temperatures ranging from 0–80° C., preferably within the range of 25° C. to 60° C. By carrying out the reaction in accordance with the present invention, i. e. in the presence of an inert liquid diluent which is a non-solvent for ammonium halides, it has been found possible to employ somewhat higher temperatures than those previously suggested without causing a noticeable amide formation.

I claim:

1. The method of producing orthoformic esters, which comprises reacting formiminoester hydrohalide with a monohydroxy unsubstituted alcohol in the presence of an inert liquid non-solvent for ammonium halides said inert liquid non-solvent being selected from the group consisting of inert liquid hydrocarbons and halogenated hydrocarbons.

2. The method of producing orthoformic esters, which comprises reacting formiminoester hydrohalide with a monohydroxy unsubstituted alcohol in the presence of an inert liquid hydrocarbon non-solvent for ammonium halides.

3. The method of producing orthoformic esters, which comprises reacting formiminoester hydrohalide with a monohydroxy substituted alcohol in the presence of an inert liquid halogenated hydrocarbon non-solvent for ammonium halides.

4. The method of producing orthoformic esters, which comprises reacting an alkyl formiminoester hydrohalide with an alkanol in the presence of an inert liquid non-solvent for ammonium halides said inert liquid non-solvent being selected from the group consisting of inert liquid hydrocarbons and halogenated hydrocarbons.

5. The method of producing orthoformic esters, which comprises reacting an alkyl formiminoester hydrohalide with an alkanol in the presence of an inert liquid hydrocarbon non-solvent for ammonium halides.

6. The method of producing orthoformic esters, which comprises reacting an alkyl formiminoester hydrohalide with an alkanol in the presence of an inert liquid halogenated hydrocarbon non-solvent for ammonium halides.

7. The method of producing orthoformic esters, which comprises reacting a lower alkyl formiminoester hydrohalide with a lower aliphatic alcohol in the presence of an inert liquid non-solvent for ammonium halides said inert liquid non-solvent being selected from the group consisting of inert liquid hydrocarbons and halogenated hydrocarbons.

8. The method of producing orthoformic esters, which comprises reacting a lower alkyl formiminoester hydrohalide with a lower aliphatic alcohol in the presence of an inert liquid hydrocarbon non-solvent for ammonium halides.

9. The method of producing orthoformic esters, which comprises reacting a lower alkyl formiminoester hydrohalide with a lower aliphatic alcohol in the presence of an inert liquid halogenated hydrocarbon non-solvent for ammonium halides.

10. The process as defined in claim 6, wherein the inert liquid halogenated hydrocarbon non-solvent for ammonium halide specified is chlorobenzene.

11. The process as defined in claim 9, wherein the inert liquid halogenated hydrocarbon non-solvent for ammonium halide specified is chlorobenzene.

JOHN W. COPENHAVER.

REFERENCES CITED

The following references are of record in the file of this patent:

UNITED STATES PATENTS

| Number | Name | Date |
|---|---|---|
| 1,934,657 | Brooker | Nov. 7, 1933 |
| 2,003,328 | MacMullin | June 4, 1947 |

OTHER REFERENCES

McElvain: "Jour. Am. Chem. Soc.," vol. 64 (1942), pages 1825–1827.

MacArdle: "Solvents in Organic Chemistry" (1935), Van Nostrand, N. Y., especially pages 103 and 118.

Pinner: "Berichter der Deut. Chem. Gess.," vol. 16 (1883), pages 164–7.

Seidell: "Solubility of Inorganic and Metal Organic Compound," 3rd edition, vol. 1 (1940), page 1052.